United States Patent
Fischer et al.

(10) Patent No.: US 10,236,730 B2
(45) Date of Patent: Mar. 19, 2019

(54) ELECTRIC MACHINE WITH LOW MAGNETIC SLOT LEAKAGE

(71) Applicant: SIEMENS AKTIENGESELLSCHAFT, München (DE)

(72) Inventors: Ralf Fischer, Nürnberg (DE); Korbinian Petermaier, München (DE); Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 169 days.

(21) Appl. No.: 15/512,369

(22) PCT Filed: Sep. 11, 2015

(86) PCT No.: PCT/EP2015/070817
§ 371 (c)(1),
(2) Date: Mar. 17, 2017

(87) PCT Pub. No.: WO2016/041857
PCT Pub. Date: Mar. 24, 2016

(65) Prior Publication Data
US 2017/0288476 A1    Oct. 5, 2017

(30) Foreign Application Priority Data
Sep. 19, 2014  (EP) .................................. 14185608

(51) Int. Cl.
*H02K 1/24* (2006.01)
*H02K 1/14* (2006.01)
*H02K 1/02* (2006.01)

(52) U.S. Cl.
CPC .............. *H02K 1/02* (2013.01); *H02K 1/146* (2013.01); *H02K 1/24* (2013.01)

(58) Field of Classification Search
CPC .. H02K 3/00; H02K 3/28; H02K 1/00; H02K 1/02; H02K 1/16; H02K 1/18; H02K 1/24; H02K 1/246; H02K 1/27; H02K 1/278
See application file for complete search history.

(56) References Cited

U.S. PATENT DOCUMENTS 4,255,684 A * 3/1981 Mischler ................ H02K 1/141
174/DIG. 20
5,095,237 A * 3/1992 Bardas ................ F16C 32/0459
310/181

(Continued)

FOREIGN PATENT DOCUMENTS

EP      1696534 A1   8/2006
GB      1114562 A    5/1968

(Continued)

*Primary Examiner* — Tran Nguyen
(74) *Attorney, Agent, or Firm* — Henry M. Feiereisen LLC

(57) ABSTRACT

An active part for an electric machine can be configured as a stator or a rotor and includes at least two slots for arranging an electric coil winding of an electric coil. Arranged between the two slots is a crosspiece which is made of a material for conducting a magnetic flux through the electric coil which surrounds the crosspiece. The material has, at least in one area, magnetic anisotropy with an easy magnetization axis, which is oriented parallel or at least at an angle of less than 25° with respect to a coil axis of the coil, and a hard magnetization axis. The crosspiece is configured to form for each of the slots a slot wall which contains the material. The crosspiece includes a core which is made of an isotropic soft-magnetic material.

15 Claims, 4 Drawing Sheets

(56) References Cited

U.S. PATENT DOCUMENTS

| | | | | |
|---|---|---|---|---|
| 5,994,814 A * | 11/1999 | Kawabata | ................ | H02K 1/08 |
| | | | | 310/156.18 |
| 2001/0030486 A1 * | 10/2001 | Pijanowski | ............. | H02K 1/04 |
| | | | | 310/254.1 |
| 2009/0113696 A1 * | 5/2009 | Holmes | .................... | H02K 1/02 |
| | | | | 29/596 |
| 2013/0119816 A1 | 5/2013 | Yang et al. | | |

FOREIGN PATENT DOCUMENTS

| | | | | | |
|---|---|---|---|---|---|
| JP | 2006197779 | A | * | 7/2006 | ................ H02K 1/18 |
| JP | 2008067572 | A | * | 3/2008 | ................ H02K 1/18 |
| JP | 2008182782 | A | | 8/2008 | |
| JP | 4343281 | B2 | | 10/2009 | |
| JP | 2010259246 | A | * | 11/2010 | ................ H02K 1/18 |
| JP | 2012050200 | A | * | 3/2012 | ................ H02K 1/18 |
| JP | 2014155347 | A | * | 8/2014 | ................ H02K 1/18 |
| WO | WO 2007141489 | A2 | | 12/2007 | |
| WO | WO 2011032201 | A1 | | 3/2011 | |
| WO | WO 2013147157 | A1 | | 10/2013 | |

\* cited by examiner

ELECTRIC MACHINE WITH LOW MAGNETIC SLOT LEAKAGE

CROSS-REFERENCES TO RELATED APPLICATIONS

This application is the U.S. National Stage of International Application No. PCT/EP2015/070817, filed Sep. 11, 2015, which designated the United States and has been published as International Publication No. WO 2016/041857 A1 which claims the priority of European Patent Application, Serial No. 14185608.8, filed Sep. 19, 2014, pursuant to 35 U.S.C. 119(a)-(d).

BACKGROUND OF THE INVENTION

The invention relates to an active part for an electric machine, which active part can be configured as a stator or rotor. The active part has slots for arranging coil windings of electric coils. In each case a crosspiece is formed between adjacent slots, and the coil windings can be wound around said crosspiece. A magnetic flux is conducted through the coils by means of the crosspiece.

An active part is understood in conjunction with the invention to be a soft-magnetic component of an electric machine, by means of which component a magnetic flux can be conducted through the coil windings which are arranged in the slots, in order to close a magnetic circuit of the electric machine. The lower a leakage flux of the magnetic circuit, the more efficiently the electric machine can be operated.

Owing to their regular arrangement, the crosspieces are also referred to as stator teeth or rotor teeth. In the electric machines, the stator teeth and rotor teeth are very frequently subjected to a high magnetic flux density, since they perform a flux collecting function of the air gap flux. The induction in these machine parts is consequently higher than in the rest of the machine. However, when there are high flux densities field displacement occurs such as can be explained with the principle of an increase in entropy. This field displacement has the effect that the magnetic field lines are forced from the tooth region into the adjacent slot. Since the magnetic resistance is significantly greater there than in the tooth material, the drop in the magnetic voltage is greater on this path. More magnetomotive force is therefore required, which in turn reduces the efficiency level of the electric machine.

UK 1 114 562 discloses a rotor for a reluctance machine, which rotor does not have any intrinsic magnetic excitement but instead has flux conduction paths between magnetic poles of the rotor. In order to improve the conduction of flux, the rotor is configured in a laminated fashion, resulting in magnetic anisotropy whose preferred direction or easy axis runs in the plane of the lamination layers and whose hard axis runs transversely with respect to the direction of extent of the lamination layers. In contrast to a conventional rotor with a laminated rotor body, the lamination layers therefore do not run perpendicularly with respect to the rotational axis but rather along or parallel to the rotational axis of the rotor.

JP 4343281 B2 discloses a reluctance rotor in which the flux conduction paths are not formed by lamination of the soft-magnetic rotor body but rather by micro-crystalline anisotropy of the iron body.

Document EP 1 696 534 A1 discloses an electric machine in which stator teeth of a stator are fabricated from a magnetically anisotropic material. For this purpose, a magnetic powder can be used as the basic fabrication material. A stator yoke of the stator can also be fabricated from a magnetically anisotropic material. Pole shoes of the stator teeth are fabricated from a magnetically isotropic material.

SUMMARY OF THE INVENTION

The invention is based on the object of configuring an electric machine with low leakage.

The object is achieved by means of the subject matter of the independent patent claims. Advantageous developments of the invention come about by virtue of the features of the dependent patent claims.

According to the invention, an active part for an electric machine is made available, wherein the active part is configured as a stator or rotor. In the event of the electric machine being a rotary machine, the active part is configured as a stator or rotor of the rotary machine. The active part has at least two slots for arranging electric coil windings of an electric coil of the electric machine. In each case a crosspiece, which can make available or form the walls of the slots, is made available between adjacent slots. The crosspiece is configured to close the magnetic circuit of the electric machine through the coil, that is to say to conduct a magnetic flux through the coil. For this purpose, the crosspiece has ferromagnetic, in particular soft-magnetic, properties.

An excessively large portion of the magnetic flux which is to be conducted by the crosspiece must be prevented from exiting the crosspiece because of the high flux density and therefore not running in the crosspiece but rather in parallel in the slots and the electric coil arranged therein. For this purpose, the crosspiece for conducting the magnetic flux has according to the invention a material which has, at least in certain areas, magnetic anisotropy with an easy magnetization axis and a hard magnetization axis. Another term for easy axis is also preferred direction. The easy axis is oriented parallel to or at least at an angle of less than 25°, in particular of less than 15°, with respect to a coil axis of the coil windings of the electric coil which surrounds the crosspiece.

The invention provides the advantage that a leakage flux transversely with respect to the coil axis, that is to say a leakage flux in a plane parallel to the winding plane, is reduced by the orientation of the easy axis.

The invention provides that in the crosspiece only the slot wall has the material and the crosspiece has a core made of an isotropic soft-magnetic material. The slot wall is here that part of the crosspiece which bounds the adjoining slot. This embodiment prevents the magnetic conductivity of the crosspiece being significantly adversely affected by the material, which is advantageous in particular in the case of large motors, that is to say motors with a power of more than 10 KW, preferably more than 50 KW.

In one embodiment, the hard axis with the lowest value of the relative permeability is oriented perpendicularly with respect to the easy axis. This can be achieved through a corresponding selection of the anisotropic material. A hard axis perpendicular to the easy axis has the advantage that a proportion of the leakage flux which leaves the crosspiece in the direction of the slots can be reduced even further.

In one embodiment, a pole shoe which is arranged on the respective crosspiece and is composed of an isotropic ferromagnetic, in particular soft-magnetic, material is made available. As a result, the magnetic flux which is bundled in the crosspiece can be distributed particularly well in the air gap by the pole shoe, or conversely a magnetic flux which is conducted from the air gap to the crosspiece can be combined particularly well by the pole shoe.

In one embodiment of the invention, a sliding slot or a sliding rail is formed in the material of the crosspiece, and the crosspiece is inserted in a conduction device, corresponding to the sliding slot or sliding rail, of a magnet yoke of the active part. Magnet yoke is to be understood here as that part of the active part which connects the crosspieces mechanically and forms the slot base of the slots. Forming a sliding slot or sliding rail in the magnetically anisotropic material of the crosspiece provides the advantage that the crosspiece can be held in the magnet yoke by means of positive engagement. As a result, it is possible to dispense with welding or bonding the crosspiece to the magnet yoke. This makes the active part simpler to fabricate.

The magnet yoke can be fabricated from a soft-magnetic material. For example, the magnet yoke can be configured in a known fashion on the basis of ferromagnetic, in particular soft-magnetic, pieces of sheet metal as a laminated packet.

However, one embodiment of the invention provides that the magnet yoke of the active part also has a magnetically anisotropic material and in the magnet yoke an easy axis of the material is oriented parallel to a slot base of the slots or at least at an angle of less than 25°, in particular less than 15°, with respect to a plane of the slot base. In the case of a rotary machine, the easy axis is therefore preferably oriented along the circumferential direction or tangentially with respect to the circumference of the rotor or stator or at an angle of less than 25 degrees, in particular less than 15°, with respect to the particular tangentials. In particular, this embodiment is provided for the case in which the active part is configured as a stator. Providing magnetically anisotropic material in the magnet yoke has the advantage that the electromagnetic compatibility of the active part is improved. In other words, the strength of a leakage flux which exits the active part toward the outside from the electric machine can be reduced to a value lower than a maximum value by means of the material in the magnet yoke.

In one embodiment, the magnetically anisotropic material which is used has just one single easy axis. As a result, the conduction of flux is stabilized even in the case of a movement of the active part with respect to the direction, since the magnetic flux cannot change its direction between a plurality of easy axes.

It has proven particularly suitable if a relative magnetic permeability of the material along the easy axis has a value greater than 15, in particular greater than 20, and along the hard axis has a value less than 5, in particular less than 2. Here, the field-conducting property of the crosspiece can, firstly, be combined particularly well with the suppression of the leakage field. In order to maintain the described magnetic properties, the alloying during the manufacture of the rotor, the tempering process during the configuration of the crosspiece and the magnetic field which has a determining effect on the anisotropy are available as parameters. Simple trials permit here the parametrization of the manufacturing process in order to obtain the described values for the relative magnetic permeability. The anisotropy is brought about, in particular, by magneto-crystalline anisotropy.

A material which has magnetic saturation at a flux density of more than 0.8 tesla, in particular at at least 1.0 tesla, is particularly suitable. This provides the advantage that the magnetic flux can be used efficiently to drive the rotor.

In order to implement all the described magnetic properties, one embodiment of the invention provides that the material has neodymium iron boron, NdFeB. This material is available in alloys in which the relative magnetic permeability can be set to the described values and the described field-conducting properties can be formed in the crosspiece by means of a coercive field strength of less than ten kiloamperes per meter. The material is therefore not a permanent magnet but instead has flux-conducting properties.

As already stated, the invention also includes an electric machine having a stator with magnet coils and having a rotor, wherein according to the invention the stator and/or the rotor each have an active part which constitutes an embodiment of the active part according to the invention.

In particular, the active part made available in the electric machine is one which is used to generate magnetic excitation in the machine, that is to say the magnetic excitation for the machine is generated electrically by means of the respective active part and by means of the coil winding arranged in the slots of the active part.

In crosspieces and pole shoes which are surrounded by an electrically excited coil winding, the magnetic flux is particularly large, with the result that the use of an anisotropic material here is particularly advantageous. In contrast to this, in the generator mode a coil which is permeated passively can advantageously have a strongly magnetic pole shoe without magnetic anisotropy, in order as a result to capture the largest possible proportion of the flux by means of the pole shoe and conduct it through the generator coil.

The invention also includes a method for manufacturing the active part according to the invention. The method comprises the steps of forming slots for arranging coil windings and for forming in each case one crosspiece between adjacent slots. Magnetic anisotropy is in each case made available in a material of each crosspiece, wherein at each crosspiece an easy axis of the anisotropy is oriented parallel to or at least at an angle of less than 25°, in particular less than 15°, with respect to the coil axis of the coil which surrounds the crosspiece. The invention provides that in the crosspiece only the slot wall has the material and the crosspiece has a core made of an isotropic soft-magnetic material.

In one embodiment, each crosspiece is formed by pressing a powder and/or granulate. The powder and/or granulate in each case has/have the material. During the pressing, a magnetic field is simultaneously applied to the powder and/or granulate. As a result, during the pressing the anisotropy is impressed into the material. This embodiment has the advantage that the crosspiece can have a shape which can be freely predetermined by means of the corresponding pressed shape.

BRIEF DESCRIPTION OF THE DRAWINGS

Exemplary embodiments of the invention are described below. In this respect.

DETAILED DESCRIPTION OF THE EMBODIMENTS

Exemplary embodiments explained below are preferred embodiments of the invention. However, in the exemplary embodiments the described components of the embodiments each represent individual features of the invention which are to be considered independently of one another and which also respectively develop the invention independently of one another, and are therefore also to be considered to be part of the invention, either individually or in a combination other than that shown. Furthermore, further features of the invention which have already been described can also be added to the described embodiments.

Figure 1:
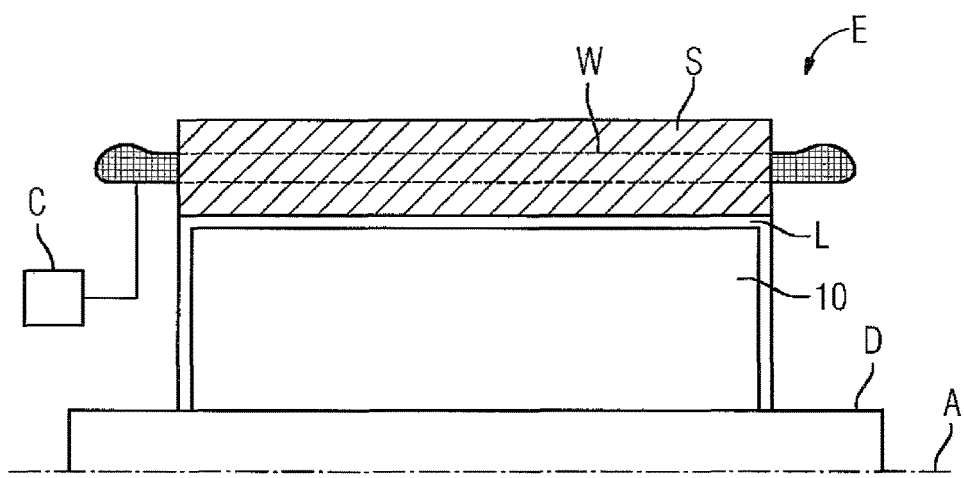
FIG. 1 shows a schematic illustration of a longitudinal section through an embodiment of the machine according to the invention.

FIG. 1 shows an electric machine E in longitudinal section, which machine E can be e.g. a synchronous motor. FIG. 1 represents a rotational axis A, also an axis of symmetry of the illustration. The electric machine E comprises a stator S in which windings of electric coils W are arranged, wherein just one of the coils W is illustrated in FIG. 1. The coils W can be energized alternately by means of a three-phase current source C, as a result of which a magnetic rotary field is produced in an air gap L of the electric machine E in the interior of the stator S. The three-phase current source C can be, for example, a power inverter or a fixed-frequency electrical supply network. The electric machine E can also be configured as a generator, wherein the three-phase current source C can be eliminated or replaced by a rectifier.

In the interior of the stator S there can be a rotor 10 which can be connected in a rotationally fixed fashion to a shaft D. The shaft D is mounted in the stator S so as to be rotatable about the rotational axis A.

The rotor 10 represents a rotor of the electric machine E. The rotor 10 can be an embodiment of the active part according to the invention. The stator S can also be an embodiment of the active part according to the invention.

In the text which follows, exemplary embodiments of the invention are explained on the basis of the stator S with reference to FIG. 2 to FIG. 6. These explanations also relate to corresponding refinements of a rotor according to the invention and of a linear rotor according to the invention.

Figure 2:
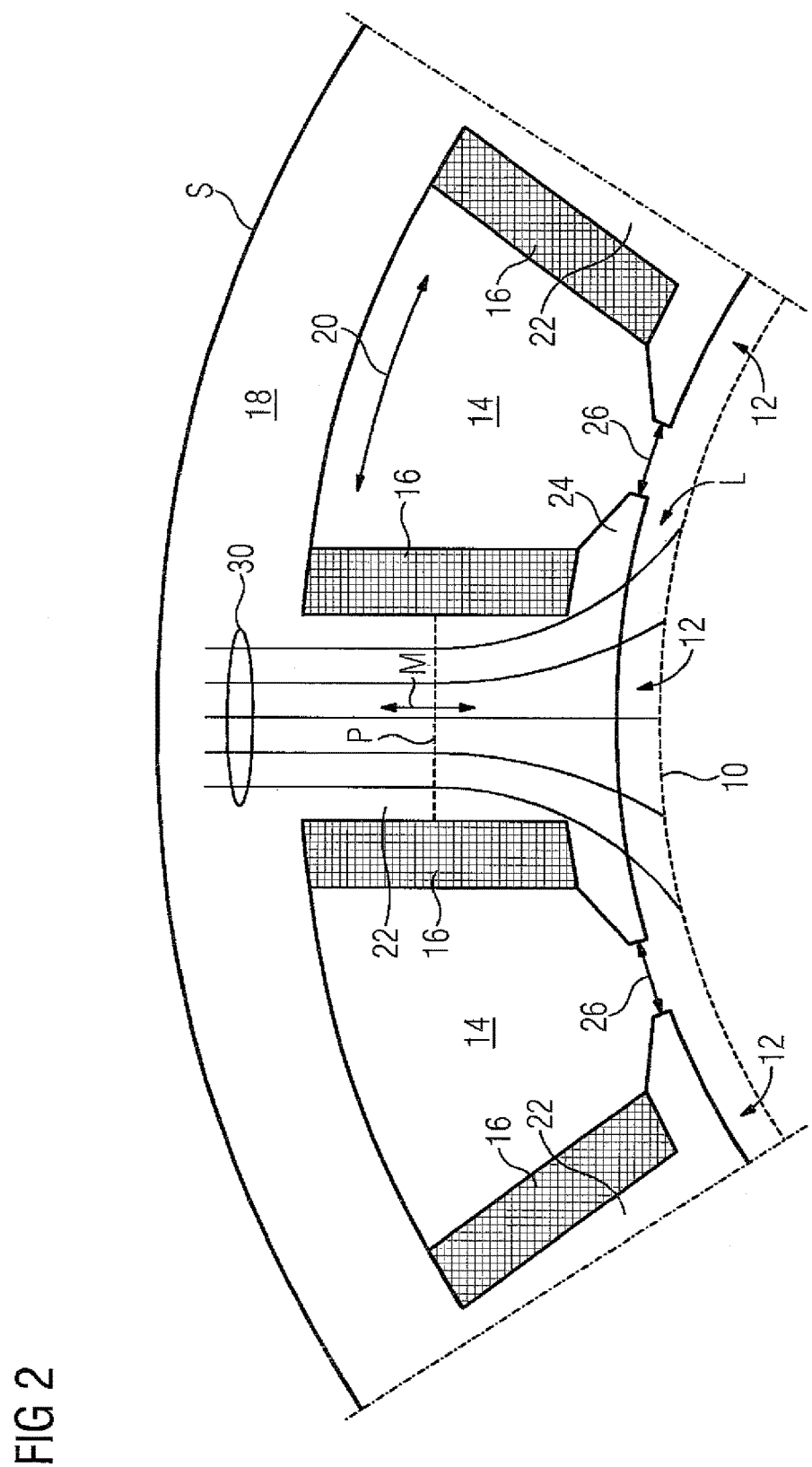
FIG. 2 shows a schematic illustration of a cross section through a stator of the electric machine in FIG. 1, wherein the stator is configured as an active part according to the invention.

As illustrated in FIG. 2, the stator S can have stator teeth 12 between which slots 14 are produced. Coil windings 16 of the coils W can be arranged in the slots 14. Coil windings 16 of one of the electric coils W can be respectively wound around, or surround, each stator tooth 12 here. An arrangement of the coil windings 16 results in a winding plane P which extends perpendicularly with respect to the plane of the drawing in FIG. 2. The coil axis M is located perpendicularly with respect to the winding plane P. The stator teeth 12 can be arranged on a magnet yoke 18, along the internal circumference 20 thereof. The winding plane P is arranged tangentially with respect to the internal circumference 20. The coil axis M is oriented radially with respect to the rotational axis A.

Each stator tooth 12 can have a crosspiece 22 made of a magnetically conductive material, i.e. a ferromagnetic, in particular a soft-magnetic, material. The crosspiece 22 represents a tooth neck of the stator tooth 12. A pole shoe 24, which can bound the crosspiece 22 with respect to the air gap L and with respect to the rotor 10, can be arranged in a manner known per se on the crosspiece 22. Pole gaps 26 are produced between the pole shoes 24 as a result of their spacing between respectively adjacent pole shoes 24.

Figure 3:
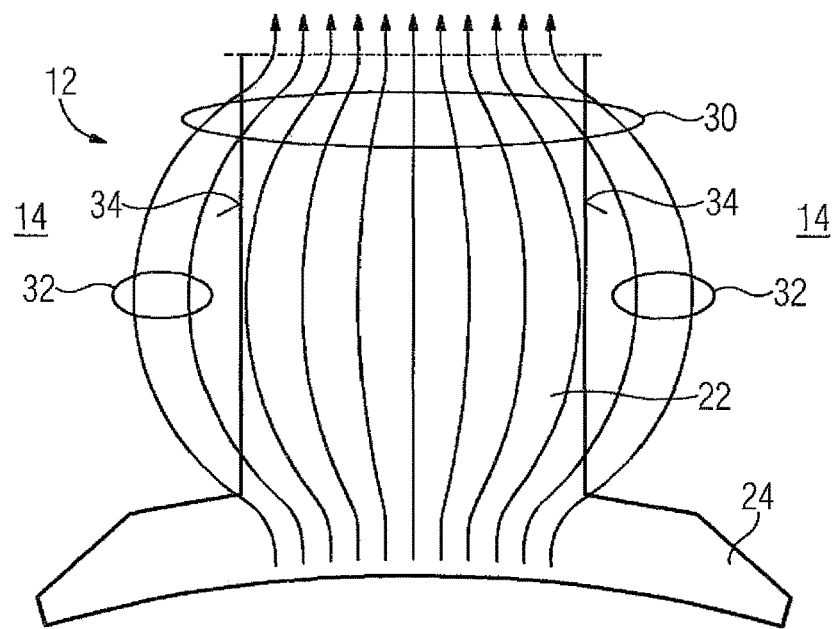
FIG. 3 shows a schematic illustration of a cross section through a stator tooth of a stator having leakage flux in slots of the stator.

The coil windings 16 can be exciter coils which can each impress a magnetic flux 30 in the stator teeth 12. The magnetic flux 30 is to be ideally conducted completely in the crosspiece 22. The intention is therefore to avoid leakage flux 32, as illustrated in FIG. 3, exiting slot walls 34 of the crosspiece 22 into the coil windings 16 (no longer illustrated in FIG. 3) in the slot 14. The induction in the stator teeth 12 causes the field displacement of the magnetic flux 30, with the result that leakage flux 32 occurs. In this context it may be even necessary for the field lines also to cross the slot 14 and penetrate the adjacent stator tooth 12, which results in the greatest magnetic resistance for the flux path.

Figure 4:
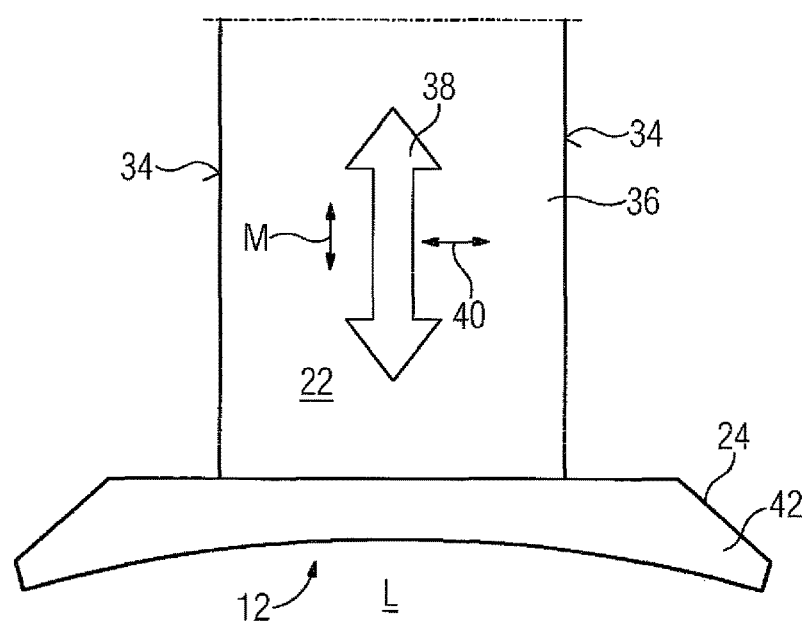
FIG. 4 shows a schematic illustration of a cross section through a stator tooth.
Figure 5:
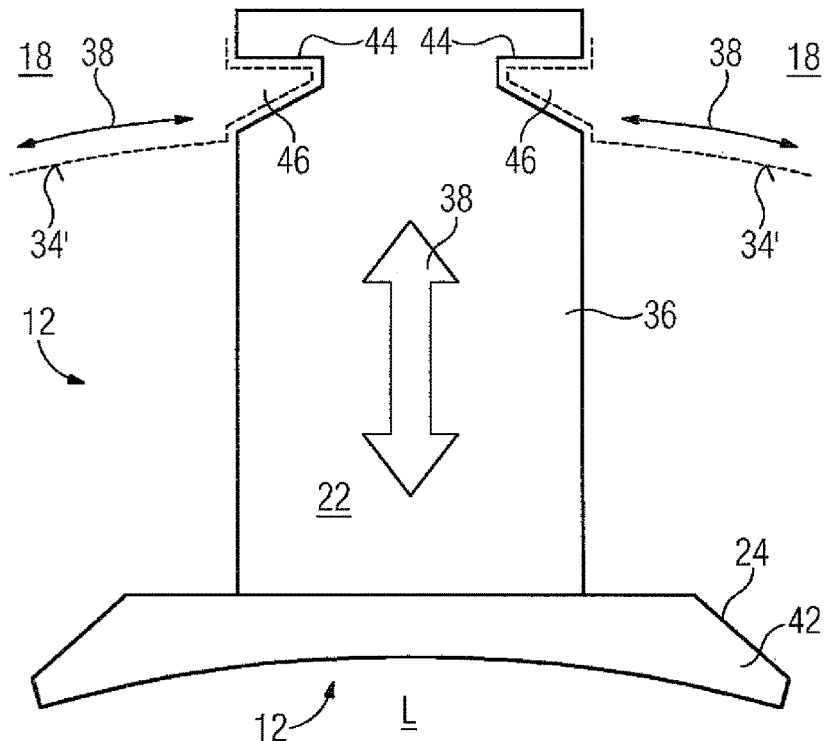
FIG. 5 shows a schematic illustration of a cross section through a stator tooth of an active part.
Figure 6:
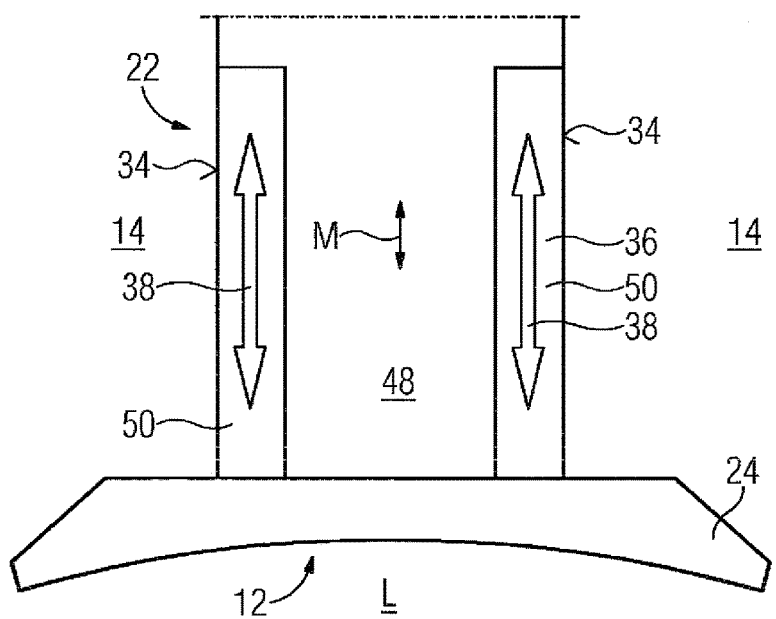
FIG. 6 shows a schematic illustration through a cross section of a stator tooth of an active part according to an embodiment of the invention.

As illustrated in FIG. 4 to FIG. 6, in the case of the electric machine E it is possible to make available a magnetically anisotropic material 36 in the crosspieces 22 for this purpose. The presence of the material is respectively illustrated in FIG. 4 to FIG. 6 by an orientation of an easy axis 38 of the material 36.

FIG. 4 shows how the material 36 can be completely made available in the entire crosspiece 22. The easy axis 38 is preferably oriented parallel to the coil axis M here. A hard axis 40 is preferably oriented perpendicularly with respect to the easy axis 38, that is to say parallel to the winding plane P. The easy axis 38 and the coil axis M can also enclose an angle which is less than 25 degrees, in particular less than 15 degrees. By orienting the easy axis 38 parallel to the coil axis M and, in particular, orienting the hard axis 40 transversely, in particular perpendicularly, with respect to the coil axis M, the leakage flux 32 which exits the slot walls 34 is reduced compared to a crosspiece which is completely configured from an isotropic soft-magnetic material.

FIG. 4 shows how the stator tooth 12 of the electric machine can have made of the anisotropic soft-magnetic material 36 in that specifically the entire tooth neck is manufactured in the form of the crosspiece 22 made of the material 36. The tooth head which is formed by the pole shoe 24 can also be composed of an isotropic soft-magnetic material. The combination of the pole shoe made of soft-magnetic isotropic material and of the crosspiece 22 made of the anisotropic material 36 also results in favorable flux distribution in the air gap L which does not deviate or deviates only insignificantly from the material 36 of the crosspiece 22. The material can have NeFeB, in particular in the way described.

FIG. 5 illustrates how the stator tooth or crosspiece 22 can be anchored or attached in the magnet yoke 18. The crosspiece 22 can be formed here from the magnetically anisotropic material 36. No particular mechanical requirements are made of the material 36 by the arrangement illustrated here. The crosspiece 22 can have sliding slots 44 in which sliding rails 46 of the magnet yoke 18 can engage. The crosspiece 22 is as a result held in the magnet yoke 18 by means of positive engagement. The sliding rails 46 represent a conduction device. The arrangement can also conversely be configured with sliding rails on the crosspiece 22 and corresponding sliding slots in the magnet yoke 18. By means of the arrangement composed of the sliding slot 44 and sliding rail 46, the tooth neck, that is to say the crosspiece 22, can, in order to make it easier to fabricate, be provided with a corresponding fit, with the result that it can be pushed into the magnet yoke 18.

The magnet yoke 18 can be fabricated from an isotropic soft-magnetic material or else be configured from anisotropic soft-magnetic material with an easy axis along the internal circumference 20, in order to reduce leakage fluxes from the active part of the electric machine E. In other words, the easy axis 38 is oriented parallel to a plane of a slot base 34' of the slots 14. This can be advantageous particularly in environments which are sensitive with respect to electromagnetic compatibility.

FIG. 6 shows an embodiment according to the invention which is advantageous specifically in the case of large motors. The windings 16 are not illustrated again in FIG. 6. In the case of the crosspiece 22, a crosspiece core 48 is fabricated from an isotropic soft-magnetic material. The slot walls 34 have a layer 50 made of the magnetically anisotropic material 36. The easy axis 38 is preferably oriented parallel to the coil axis M in the way described. The layer 50 lines the tooth necks on the longitudinal side with the in the material 36. In the case of a rotor there is a resulting orientation of the easy axis 38 radially or diametrically in the cross section of the rotary machine. An advantage of this embodiment is that the stator S can have a conventional design, for example made of a laminated packet, and nevertheless the slot leakage 32 is reduced by means of the layer 50.

Until now, stator teeth of electric machines have been manufactured from electrical sheet steel or from some other magnetically isotropic material. A use of the described anisotropic soft-magnetic material as a material is advantageous for reducing the slot leakage 32, resulting in a lower voltage demand. The number of turns of the machine can therefore be increased. This gives rise to a reduced power demand, which leads to a reduction in costs in the case of power converters and motors. The reduced power shift lowers the motor losses and therefore permits an increase in the machine performance.

As a result of the use of anisotropic soft-magnetic material, specifically the magnetic flux in the teeth can be channeled better and the occurrence of field lines in the slot space can be prevented. The anisotropic material preferably has the property that its easy magnetic axis has a relative permeability of more than 15, in particular more than 20, and all the other axes which are orthogonal to this easy axis have a significantly lower permeability, in particular less than 5, in particular less than 2.

If the easy axis of the anisotropic soft-magnetic material is arranged in the desired direction of flux, it is made more difficult for the flux lines to exit the tooth region. This lowers the slot leakage inductance which is present in all machines but does not contribute to the generation of torque. A lower leakage inductance also improves the performance factor cosphi. In addition, the power shift in the conductors of the coil windings is reduced, as are circular currents (often also referred to as oscillating currents) in partial conductors of a coil which are connected in parallel.

Overall, the examples show how the invention can keep the magnetic leakage flux low in slots of a stator and/or of a rotor.

The invention claimed is:

1. An active part for an electric machine, said active part configured as a stator or a rotor and comprising:
    at least two slots for arranging an electric coil winding of an electric coil; and
    a crosspiece arranged between the two slots and made of a material for conducting a magnetic flux through the electric coil that surrounds the crosspiece, wherein the material having, at least in one area of the crosspiece, magnetic anisotropy with an easy magnetization axis that is oriented parallel or at least at an angle of less than 25° with respect to a coil axis of the coil, and a hard magnetization axis, said crosspiece configured to form for each of the slots a slot wall that contains the material, said crosspiece further configured to include a core made of an isotropic soft-magnetic material.

2. The active part of claim 1, wherein the active part is configured as a stator or a rotor of a rotary machine.

3. The active part of claim 1, further comprising a pole shoe arranged on the crosspiece, said pole shoe being composed of an isotropic soft-magnetic material.

4. The active part of claim 1, wherein the material has formed therein a sliding slot or a sliding rail, and further comprising a magnet yoke having a conduction device for insertion of the crosspiece.

5. The active part of claim 1, wherein the easy magnetization axis is the sole easy magnetization axis of the material.

6. The active part of claim 1, wherein the hard magnetization axis is oriented perpendicularly with respect to the easy magnetization axis.

7. The active part of claim 1, wherein the material has a relative magnetic permeability of a value that along the easy magnetization axis is greater than 15 and a value that along the hard magnetization axis is less than 5.

8. The active part of claim 7, wherein the value along the easy magnetization axis is greater than 20, and wherein the value along the hard magnetization axis is less than 2.

9. The active part of claim 1, wherein the material has a magnetic saturation that occurs at a flux density of more than 0.8 tesla.

10. The active part of claim 1, wherein the material has a magnetic saturation that occurs at a flux density of at least 1.0 tesla.

11. The active part of claim 1, wherein the material has neodymium iron boron.

12. The active part of claim 1, further comprising a magnet yoke that includes magnetically anisotropic material, said material having in the magnet yoke an easy magnetization axis that is oriented parallel to a slot base of the slots or at least at an angle of less than 25° with respect to a plane of the slot base.

13. An electric machine, comprising:
    a stator with electric coils; and
    a rotor interacting with the stator,
    at least one member selected from the group consisting of the stator and the rotor includes an active part including at least two slots for arranging an electric coil winding of an electric coil, and a crosspiece arranged between the two slots and made of a material for conducting a magnetic flux through the electric coil that surrounds the crosspiece, wherein the material having, at least in one area of the crosspiece, magnetic anisotropy with an easy magnetization axis that is oriented parallel or at least at an angle of less than 25° with respect to a coil axis of the coil, and a hard magnetization axis, said crosspiece configured to form for each of the slots a slot wall that contains the material, said crosspiece further configured to include a core made of an isotropic soft-magnetic material.

14. A method for manufacturing an active part, comprising:
    forming slots for arranging coil windings of an electric coil;
    forming between adjacent ones of the slots a crosspiece such as to form for each of the slots a slot wall that contains a material having magnetic anisotropy with an easy magnetization axis that is oriented parallel or at least at an angle of less than 25° with respect to a coil axis of the electric coil, and a hard magnetization axis; and providing the crosspiece with a core of an isotropic soft-magnetic material.

15. The method of claim 14, wherein the crosspiece is formed by pressing a powder and/or a granulate containing the material, and simultaneously applying a magnetic field to the powder and/or to the granulate.

\* \* \* \* \*